April 22, 1930.   F. C. BRANDENBURG   1,755,236
SHOVEL AND SHOVEL HANDLE
Filed July 2, 1926   2 Sheets-Sheet 1
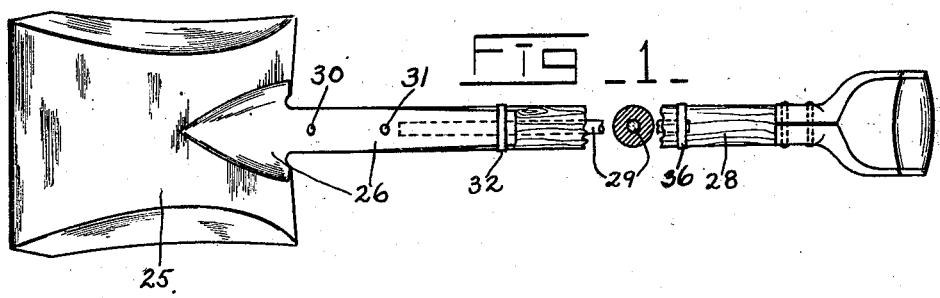
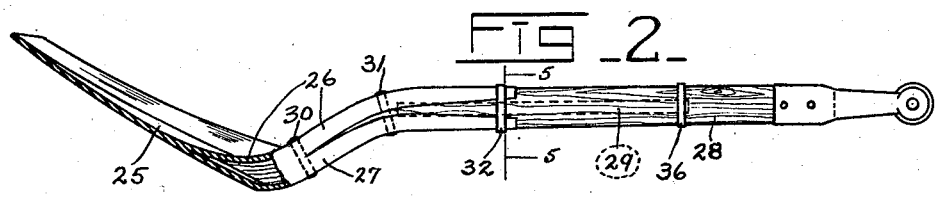
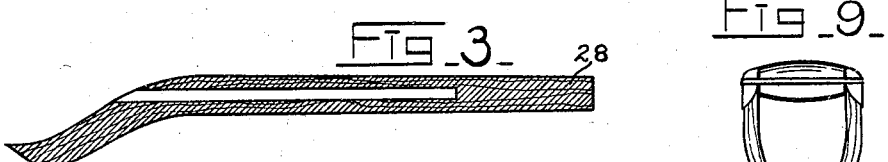
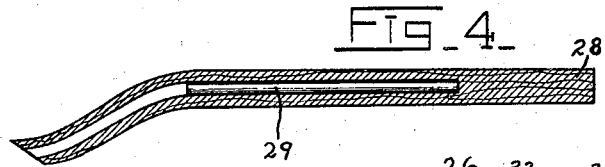
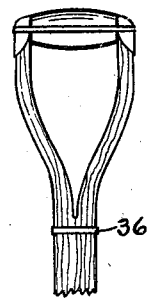
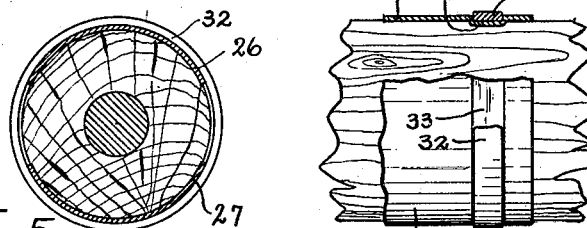
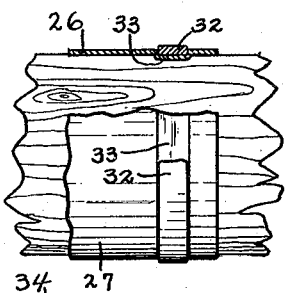
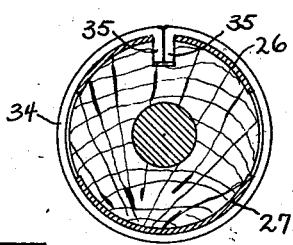
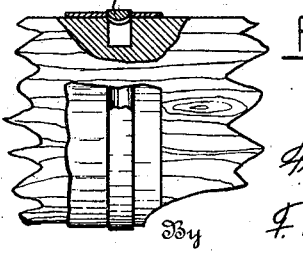
Inventor
Francis C. Brandenburg,
By F. R. Fassett,
Attorney.

April 22, 1930.  F. C. BRANDENBURG  1,755,236
SHOVEL AND SHOVEL HANDLE
Filed July 2, 1926  2 Sheets-Sheet 2
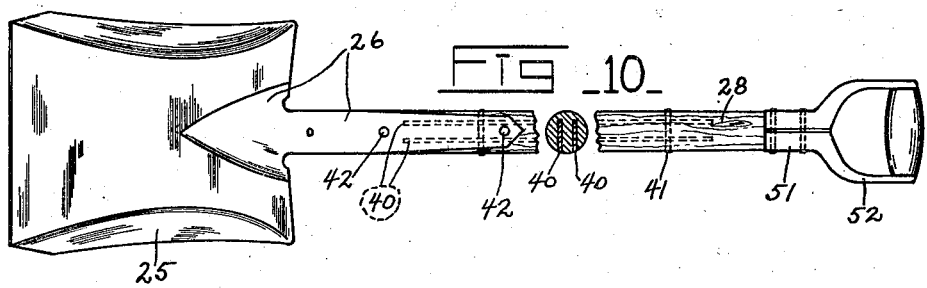
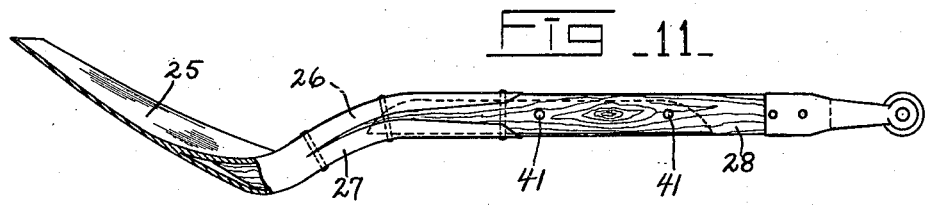
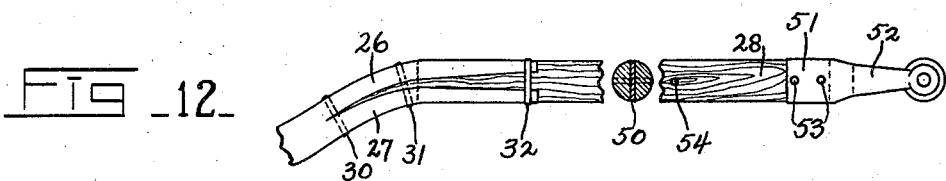
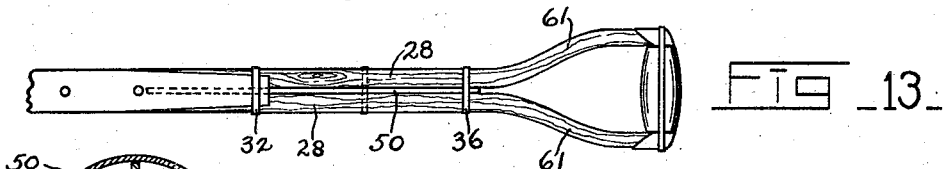
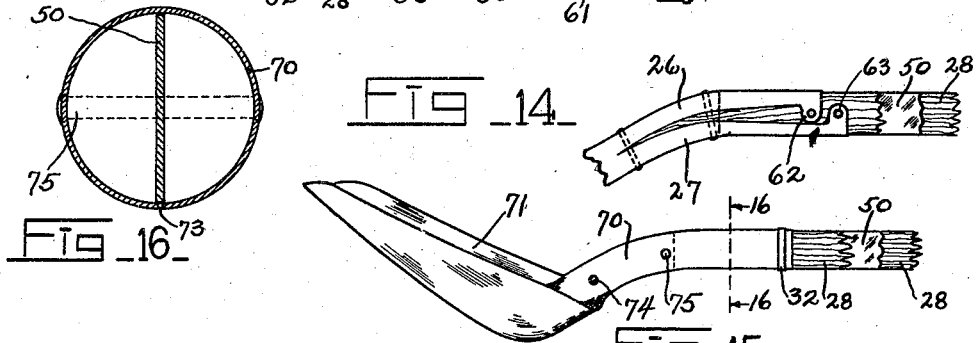
Inventor
Francis C. Brandenburg,
By F. K. Fassett,
Attorney.

Patented Apr. 22, 1930

1,755,236

UNITED STATES PATENT OFFICE

FRANCIS C. BRANDENBURG, OF PIQUA, OHIO, ASSIGNOR TO THE WOOD SHOVEL AND TOOL COMPANY, OF PIQUA, OHIO, A CORPORATION OF OHIO

SHOVEL AND SHOVEL HANDLE

Application filed July 2, 1926. Serial No. 120,210.

This invention relates to shovel handles reinforced with metallic inserts, and to shovels equipped with reinforced handles.

One of the objects of reinforcing shovel handles is to give the handles greater strength. In high grade shovels the object is to make the strength of the handles commensurate with the strength of the other parts of the shovels. This is an important matter where shovels are subjected to severe strains, as in laying railroad tracks. In track work the shovels are used as pries to lift the ends of the ties while earth and stones are tamped under the ties. Another object of reinforcing shovel handles is to permit the use in shovels of grades of wood which could not otherwise be used. Other objects will be referred to presently.

My invention also includes certain features adapted to facilitate the attachment of reinforced handles to shovels, whereby the fullest benefit may be derived from reinforcing the handles. In other words, my purpose is to retain substantially unimpaired the strength and other well known and desirable characteristics of the wooden handle, and simply add to this the strength of the reinforcing member.

The invention is illustrated in the accompanying drawing, in which,

Fig. 1 is a front view of a shovel having a reinforced handle in which the reinforcing member is entirely surrounded by the wood of the handle;

Fig. 2 is a side view of the shovel shown in Fig. 1;

Figs. 3 and 4 show two ways of putting the reinforcing member used in Figs. 1 and 2 into the handle;

Fig. 5 shows a cross-section of the handle on line 5—5 of Fig. 2;

Fig. 6 is a fragmental side view of the portion of the handle shown in Fig. 5;

Figs. 7 and 8 are views similar to Figs. 5 and 6, but showing a modified form of band for securing the straps to the handle;

Fig. 9 shows the use of a band similar to that shown in Figs. 5 and 6 on the well known split D handle, taking the place of the rivet ordinarily used at that point on split D handles;

Fig. 10 is a front view of a shovel in which the handle is provided with reinforcement consisting of two flat strips of metal, inserted from the rear of the handle;

Fig. 11 is a side view of the shovel shown in Fig. 10;

Fig. 12 is a side view of a shovel having a single flat reinforcement in the handle, extending into the socket of the grip;

Fig. 13 shows the application of the flat reinforcement to the split D type of handle;

Fig. 14 shows a modified manner of securing the ends of the straps to the handle. Figs. 12, 13 and 14 are supposed to represent complete shovels, but to save space certain portions are broken away;

Fig. 15 shows a shovel of the "hollow back" type; and

Fig. 16 is a section on line 16—16 in Fig. 15.

Referring more particularly to Figs. 1 and 2 the metal part of the shovel comprises a blade 25, a front strap 26 and a back strap 27. The straps are welded to the blade in the usual way, and they combine to form a socket to receive the lower end of the wooden handle 28, which is bent near its lower end, all as usual. Inserted in the handle is a round metal rod 29. The handle is secured in the socket 26—27 by rivets 30 and 31, the former being close to the juncture of the socket and blade, and the latter at about the point where the bend in the handle begins. The ends of the strap are secured to the handle with a metal band 32. This is more clearly illustrated in Figs. 5 and 6.

Close to their ends the straps 26—27 have grooves 33 formed in them to receive the band 32. The band, which is endless, is large enough in diameter, originally, to slip over the ends of the straps. The band is then contracted by a swaging operation to draw the straps tightly to the handle. Sufficient pressure may be applied to compress the wood itself, slightly, so that when the presure is removed the expansion of the wood, due to its resiliency, will put the band in tension. In Figs. 7 and 8 the band 34 is used, which band is not endless, but its ends 35—35 are tucked into a hole in one of the straps and in the handle and then contracted by swaging as already described. In order to distribute the strain at the upper end of the rod 29 a band 36 is swaged on the handle. This band need not be thick and in swaging it it may be pressed into the wood, so that its outer surface is substantially flush with the surface of the wood.

There are two ways of inserting the rod 29. In Fig. 3 the handle is bored after it is bent and the rod may be inserted just before the handle is put into the socket. In Fig. 4 the handle is bored and the rod inserted before the handle is bent. In either case the length of the rod is such, preferably, that it terminates at the point where the bend begins. After the rod is inserted a plug may be inserted in the portion of the bore not occupied by the rod, but this is not necessary, because the rivet 31 is placed adjacent to the end of the rod and serves to keep the rod in place. If desired the rod may be tubular.

The rivet 31 may be omitted and a band similar to the band 32 put on at about the point where the rivet 31 is situated, and in such case the rod may be allowed to extend to the end of the bore, in the handle shown in Fig. 3, or, in the form shown in Fig. 4, the rod may be still longer and be bent when the handle is bent. These modifications are unnecessary, unless it be in special cases, because reinforcement is not needed in the lower end of the handle. It suffices if the reinforcing member extends far enough into the socket to secure a firm juncture with the socket, and this is effected by extending the rod to the bend, i. e., to the rivet 31.

In Figs. 10 and 11 the reinforcement consists in two comparatively thin strips of metal, 40—40, lying in deep saw-cuts in the back of the handle and secured with rivets 41. These strips are placed a sufficient distance apart to permit the rivets 42 to pass between them, but if desired one or both of these rivets may be replaced by bands 32. Furthermore, if bands are used one strip 40 may be put in the center of the handle, instead of two strips being used. This is an obvious modification and need not be illustrated.

In Fig. 12 the flat reinforcing strip 50 is in the center of the handle and its width is equal to the diameter of the handle, so the edges of the strip are flush with the surface of the handle. In this structure the strip extends to the upper end of the handle and therefore enters the socket 51 of the metal D handle 52, a front view of which D is seen in Fig. 10. The rivets 53 pass through the strip 50 as well as through the handle 28 and the walls of the socket, and on the whole this is a very rugged structure. One or more rivets 54 are put through the handle and strip between the ends of the straps 26—27 and the socket 51, as desired. It is not necessary, however, to extend the strip into the socket 51. This handle is secured in the socket 26—27 with rivets 30 and 31 and a band 32, as in the case of the structure shown in Figs. 1 and 2. As the edges of the strip 50 are flush with the surface of the wood, the edges impinge on the straps 26 and 27. In other words, the straps are drawn by the rivets and band tightly against the edges of the strip as well as the wooden portion of the handle, converting the strip, in effect, into a metal extension of the socket. The strip extends into the socket only to the rivet 31 and it is therefore rectilineal throughout its length. For this reason manufacture of the strips is a very simple matter. Metal can be rolled into strips of the desired width and merely cut into pieces of the required length. In cases where it is desirable to taper the handles, sheets can easily be sheared into tapered strips. By using cold rolled metal, strips of great strength can be made from comparatively thin metal, and as the strips are set on edge with reference to the normal strain on the handle sufficient strength is obtainable with metal so thin that the weight of the handle is but slightly increased by the presence of the metal.

The structure shown in Fig. 13 differs from that just described only in that the ends of the wooden handle 28 are bent to form the arms 61—61 of a "split D" handle, and a ring 36 is contracted around the handle at the point where the handle begins to branch out. Incidentally it will be noticed that the ring 36 may be used on a plain "split D" handle at the point where the arms spread out, instead of the rivet usually put in the handle at that point. See Fig. 9. In Fig. 14 the ends of the straps 26 and 27 are provided with ears 62 and 63, which embrace the handle and are secured thereto with rivets.

While in the structures shown in Figs. 11, 12, 13 and 14 it is assumed that the handle is made of a single piece of wood, slotted to receive the metal strip, the handle may be made of two half-round pieces of wood, with the flat side of each lying against the metal strip. This is so obvious that it is not necessary to illustrate it. As more than twice as many such half-round pieces can be obtained from a given quantity of lumber than round pieces, it follows that making handles in that way would effect an economy of lumber. Moreover, as I have already stated, grades of lumber can be used in reinforced handles which would not be suitable for making ordinary handles. But my invention is useful not only as a means of using inferior material; it is very useful where the best quality of wood is used, for it enables the handles to keep pace with other improvements in shovels. By using alloy steel, and heat treating the steel of which shovels are made, modern shovels are very much stronger and more durable than shovels of the past. But in order to obtain the greatest benefit from these improvements it has been found necessary to increase the strength of the handles. All-metal handles, though stronger, are objectionable because they are too cold for men to work with in cold weather. It results, therefore, that reinforced wooden handles have great utility and are almost a necessity.

The shovels so far described are of the welded strap type, but my invention is also adapted to the so called "hollow back" type of shovel, as is illustrated in Fig. 15. In this shovel the handle socket 70 and blade 71 are formed from a single piece of metal, the socket entirely encircling the handle, with a single slit 73 at the back. See Fig. 16. As the "hollow back" shovel is well known in the art further description is needless. The handle is secured in the pocket with rivets 74—75 and the lower end of the reinforcing strip 50 is contiguous to the rivet 75. A ring 32 is used on the end of the socket, as before. But with this type of shovel, in which the rivets run from side to side of the socket, instead of from front to back, thereby avoiding the slit 73 at the back of the socket, a rivet may be used at the upper end of the socket instead of a ring 32, if desired. It is evident that a handle having the round reinforcing member shown in Figs. 1 and 2 may be used with this type of shovel.

It will be observed that in each of the structures shown the reinforcing member is a reinforcement or auxiliary in fact. That is, the wooden handle is the major element in the structure. It is clamped in a socket and thus rigidly secured to the blade in the usual way and independently of the reinforcing element. The amount the handle is reduced in strength in providing space for the reinforcing member is almost negligible.

Although I have shown several variations of my invention it is not to be understood that these exhaust the possibilities for its adaptation.

The scope of the invention is defined by the appended claims, which are as follows:

1. A shovel comprising a blade having a handle socket with a wooden handle therein, a rivet which passes through the walls of the socket and through the handle, said handle having an axial bore occupied by a metal rod one end of which is adjacent to said rivet, the other end extending beyond the end of the socket, and means for securing the upper end of the socket to the handle.

2. A shovel comprising a blade having a handle socket with a wooden handle therein, said handle having an axial bore occupied by a metal rod, which rod extends from a point within the socket to a substantial distance above the socket, and a metal band encircling the upper end of the socket and contracted thereon sufficiently to put the band under tension.

3. A shovel comprising a blade with a handle socket formed by front and back straps, a handle in said socket having an axial bore occupied by a round metal rod, which rod extends from a point within the socket to a point above the ends of the straps, and means for securing the straps to the handle.

4. A wooden shovel handle having a metal reinforcing member within it, all of which member is surrounded by the wood.

5. A shovel comprising a blade with a handle socket formed by a front and a back strap, a wooden handle in said socket, a metal reinforcing member in said handle, extending from a point within the socket to a point above the ends of the straps, said member being entirely surrounded by said handle, and means for securing the straps to the handle.

6. In a shovel, a wooden handle, a metal socket thereon, a hole in said socket, a strip of metal bent to surround the socket, with its ends bent and tucked into said hole, said band being so tight it binds the socket to the handle.

7. A shovel handle comprising a wooden member having an axial bore, a metal rod therein, one end of which rod is intermediate the ends of said wooden member, and a metal band surrounding the wooden member at about the point where said rod end is located.

8. A shovel comprising a blade having a handle socket with a wooden handle therein, said handle having an axial bore occupied by a metal rod, which rod extends from a point within the socket to a substantial distance above the socket, and a metal band tightly encircling the upper end of the socket, said band consisting of a strip of metal with its ends bent inward and inserted in a hole in the socket.

FRANCIS C. BRANDENBURG.